United States Patent
Mizes

(10) Patent No.: US 7,515,305 B2
(45) Date of Patent: Apr. 7, 2009

(54) SYSTEMS AND METHODS FOR MEASURING UNIFORMITY IN IMAGES

(75) Inventor: Howard Mizes, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 823 days.

(21) Appl. No.: 11/084,280

(22) Filed: Mar. 18, 2005

(65) Prior Publication Data
US 2006/0209101 A1    Sep. 21, 2006

(51) Int. Cl.
G06K 15/00 (2006.01)
G06T 5/00 (2006.01)
H04N 1/46 (2006.01)
H04N 1/405 (2006.01)
H04N 1/407 (2006.01)
H04N 1/409 (2006.01)

(52) U.S. Cl. .............. 358/3.26; 358/3.06; 358/406; 358/504

(58) Field of Classification Search ............... 358/1.9, 358/3.06, 3.26, 3.27, 406, 504
See application file for complete search history.

(56) References Cited

U.S. PATENT DOCUMENTS

| 4,553,033 | A | 11/1985 | Hubble, III et al. |
| 5,546,165 | A | 8/1996 | Rushing et al. |
| 6,760,056 | B2 | 7/2004 | Klassen et al. |
| 6,843,610 | B2* | 1/2005 | Ioka et al. ............... 400/76 |
| 6,907,132 | B1* | 6/2005 | Salomon ............... 382/101 |
| 2003/0071866 | A1* | 4/2003 | Wong et al. ............... 347/19 |

* cited by examiner

Primary Examiner—James A Thompson
(74) Attorney, Agent, or Firm—Fay Sharpe LLP

(57) ABSTRACT

A method for measuring spatial uniformity in an image is provided and includes printing a test pattern from an image forming device having a plurality of strips and rows of fiducials proximal thereto. The method further provides for correcting of distortions in an image caused by printing and scanning artifacts and mapping from scanner coordinates to digital image coordinates. A gray level of each strip in the plurality of strips is determined as a function of digital image cross process coordinate. The method further provides for a profile of each strip to be filtered whereby the artifacts from a halftone screen are eliminated.

23 Claims, 16 Drawing Sheets

SYSTEMS AND METHODS FOR MEASURING UNIFORMITY IN IMAGES

BACKGROUND

The exemplary embodiments relate to the art of digital imaging. It finds particular application in macro uniformity corrections for non-uniformities in a raster output scanning (ROS) printing system and will be described with particular reference thereto. It will be appreciated, however, that the disclosure is also amenable to other like applications.

Macro non-uniformity levels have existed in raster scan image output terminals (IOTs) (e.g., xerographic printers) for some time and are a concern for most marking processes. Even small non-uniformity level errors in raster scan IOTs give rise to visually objectionable banding in halftone outputs (e.g., image macro non-uniformity streak artifacts). Such errors typically arise in raster scan image output terminals (IOTs) due to variations in ROS spot size across the field (which is constant in time (print to print)), donor-roll once-around, HSD wire hysteresis, laser diode variations, LED bar power variation, ROS scan line non-uniformity, photoreceptor belt sensitivity variations, and/or ROS velocity non-uniformity. Significantly, many variations occur only in the fast scan (e.g., X) or slow scan (e.g., Y) directions, and they do not interact to first order. Therefore, a correction made in one direction has a negligible effect on artifacts in the other direction. Other printing technologies (e.g. thermal inkjet and acoustical ink printing) also have artifacts that occur in a regular, predictable manner in one or both directions and fall within the scope of this discussion.

Although techniques have been proposed to eliminate such non-uniformity errors by making physical systems more uniform, it is too expensive to control or limit the error to an acceptable level, below which the error will not be detected by the unaided eye. Fixes have been attempted in the marking process, but not enough latitude exists to fully solve the problem. For problem sources such as LED non-uniformity, the correction is sometimes addressed with current control or pulse width control. However, none of the solutions discussed above implements a technique based in digital electronics. With the cost of computing rapidly decreasing, such digital electronics based solutions are becoming more attractive.

The exemplary embodiments provide a new and improved method which overcomes the above-referenced problems and others. The exemplary embodiments relate to a method for sensing print defects in electrostatically formed images. It is to be appreciated that the exemplary embodiments are also amenable to other like applications.

Various apparatuses for recording images on sheets have heretofore been put into practical use. When the subsystems of an electrophotographic or similar image forming system operate under suboptimal conditions, a lack of print uniformity may result. Streaks can arise from a non-uniform LED imager, contamination of the high voltage elements in a charger, scratches in the photoreceptor surface, etc.

In a uniform patch of gray, streaks and bands may appear as a variation in the gray level. In general, "gray" refers to the intensity value of any single color separation layer, whether the toner is black, cyan, magenta, yellow, or some other color. One method of reducing such streaks is to design and manufacture the critical parameters of the marking engine subsystems to tight specifications. Often though, such precision manufacturing will prove to be cost prohibitive.

The streaks that can arise from the different subsystems can be prevented by modifying the image or actuating another subsystem to counteract the streak. To counteract streaks that arise, their size and magnitude must be sensed and measured with high precision. One of the image quality attributes of high quality printers is spatial uniformity in the cross process direction. In order to monitor the spatial uniformity, an accurate image processing technique is required to measure the uniformity. The image processing algorithms heretofore known, for detecting or sensing defects, fail or give erroneous results. Making high precision measurements of the streak's magnitude and size is limited by distortions that occur during the printing of the image and/or scanning of the image. The distortions may not be objectionable in viewing typical images, but they may be of a magnitude that prevents an accurate measurement of the degree of streaking. Examples of printing and/or scanning defects include process and cross process position waviness, image rotation, process direction expansion of the image, image deletions, background toner, and scanner induced distortion of the image.

A tone reproduction curve (TRC) may be measured by printing patches of different bitmap area coverage. In some digital image processing applications, the reflectivity of a patch of gray is measured with a toner area coverage sensor. The manner of operation of the fixed position sensor is described in U.S. Pat. No. 4,553,033, which is incorporated herein by reference in its entirety. Toner area coverage sensors are typically designed with an illumination beam much larger than the halftone screen dimension. This large beam does not provide the resolution for the toner area coverage sensor to be useful as a sensor for the narrow streaks that may occur for poorly performing subsystems.

U.S. Pat. No. 6,760,056 by Klassen et. al, incorporated herein by reference in its entirety, discloses one exemplary embodiment of a method for compensating for streaks introducing a separate tone reproduction curve for each pixel column in the cross process direction. A compensation pattern is printed and then scanned to first measure the ideal tone reproduction curve and then detects and measure streaks. The tone reproduction curves for the pixel columns associated with the streak are then modified to compensate for the streak.

CROSS REFERENCE TO RELATED APPLICATIONS

The subject application is related to the following co-pending application: U.S. application Ser. No. 10/739,177, filed Dec. 19, 2003, by Howard Mizes, entitled "Systems and Methods for Compensating For Streaks in Images", which is herein incorporated by reference.

BRIEF DESCRIPTION

According to one aspect, a xerographic device utilizing a method is provided for measuring spatial uniformity in an image. The method comprises printing a test pattern from an image forming device including a plurality of strips and rows of fiducials proximal thereto. The method further provides for correcting of distortions in an image caused by printing and scanning artifacts and mapping from scanner coordinates to digital image coordinates. A gray level of each strip in the plurality of strips can be determined as a function of digital image cross process coordinate. A profile of each strip can be filtered whereby the artifacts from a halftone screen are eliminated.

According to another aspect, a printing system utilizing a method is provided for measuring spatial uniformity in an image that is translated through an image forming device. The method comprises printing a test pattern from the image forming device including a plurality of strips in a process direction. The test pattern can include a series of fiducials aligned in rows in the process direction. Each row of fiducials can be proximal to a separate one of the plurality of strips. A process direction displacement can be determined as a function of a cross process position of the first strip of the test pattern. Each pixel column of an image can be shifted in the process direction to adjust the first strip in a horizontal orientation. A location of the first strip can be identified from the plurality of strips and a first row of fiducials adjacent thereto. A scanner cross process position of each fiducial is determined in the first row of fiducials, wherein the scanner cross process position coordinates can be mapped to digital image cross process position coordinates.

According to yet another aspect, a method is provided for measuring spatial uniformity in an image that is translated through an image forming device. The method comprises printing a test pattern from the image forming device including a top line and a plurality of strips below the top line in a process direction. The test pattern can include a series of fiducials aligned in rows in the process direction. Each row of fiducials can be adjacent to a separate one of the plurality of strips. The method further includes determining a process direction displacement as a function of a cross process position of the top line of the test pattern and extracting a profile of the top line. Each pixel column of the image is shifted in the process direction to adjust the top line in a horizontal orientation. The location of a first strip is identified from the plurality of strips and a first row of fiducials adjacent thereto. A scanner cross process position coordinate of each fiducial is determined in the first row of fiducials.

According to yet still a further aspect, a method is provided for measuring print uniformity in an image that is translated through an image forming device, including printing a test pattern from the image forming device having a strip. A cross section of the strip is measured for determining a dot and space periodicity pattern from a halftone brick of the strip. The measuring of the cross section includes printing a test pattern from the image forming device including a solid top line and a plurality of strips below the top line in a process direction. The test pattern includes a series of fiducials aligned in rows in the process direction. Each row of fiducials can be adjacent to a separate one of the plurality of strips. A process direction displacement is then determined as a function of a cross process position of the top line of the test pattern. A profile of the top line is extracted. Each pixel column of the image is shifted in the process direction to adjust the top line in a horizontal orientation. The method further provides for identifying the location of a first strip from the plurality of strips and a first row of fiducials adjacent thereto, and descreening the halftone brick to remove the periodicity.

DRAWING DESCRIPTIONS

Figure 14:
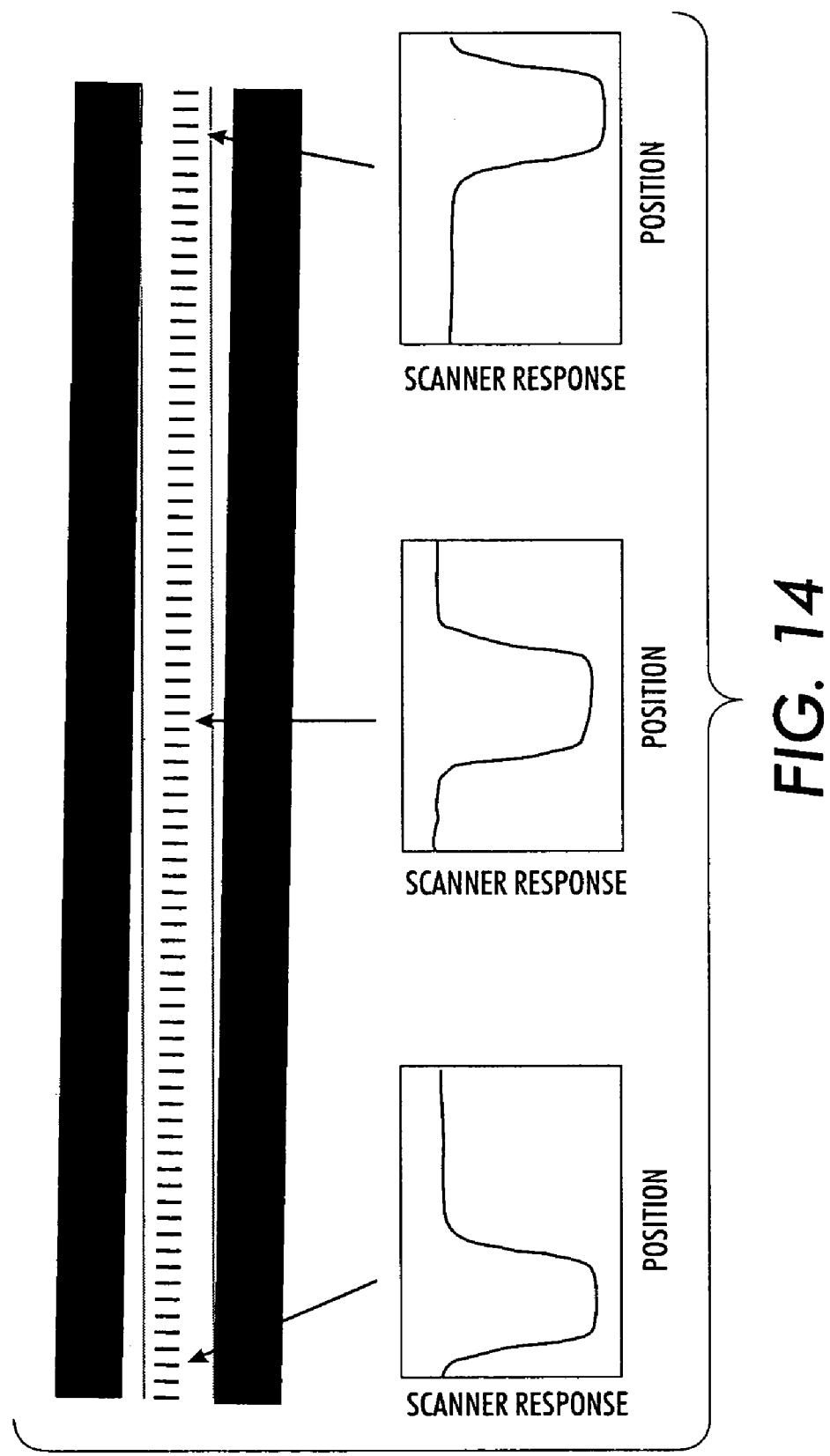
Figure 15:
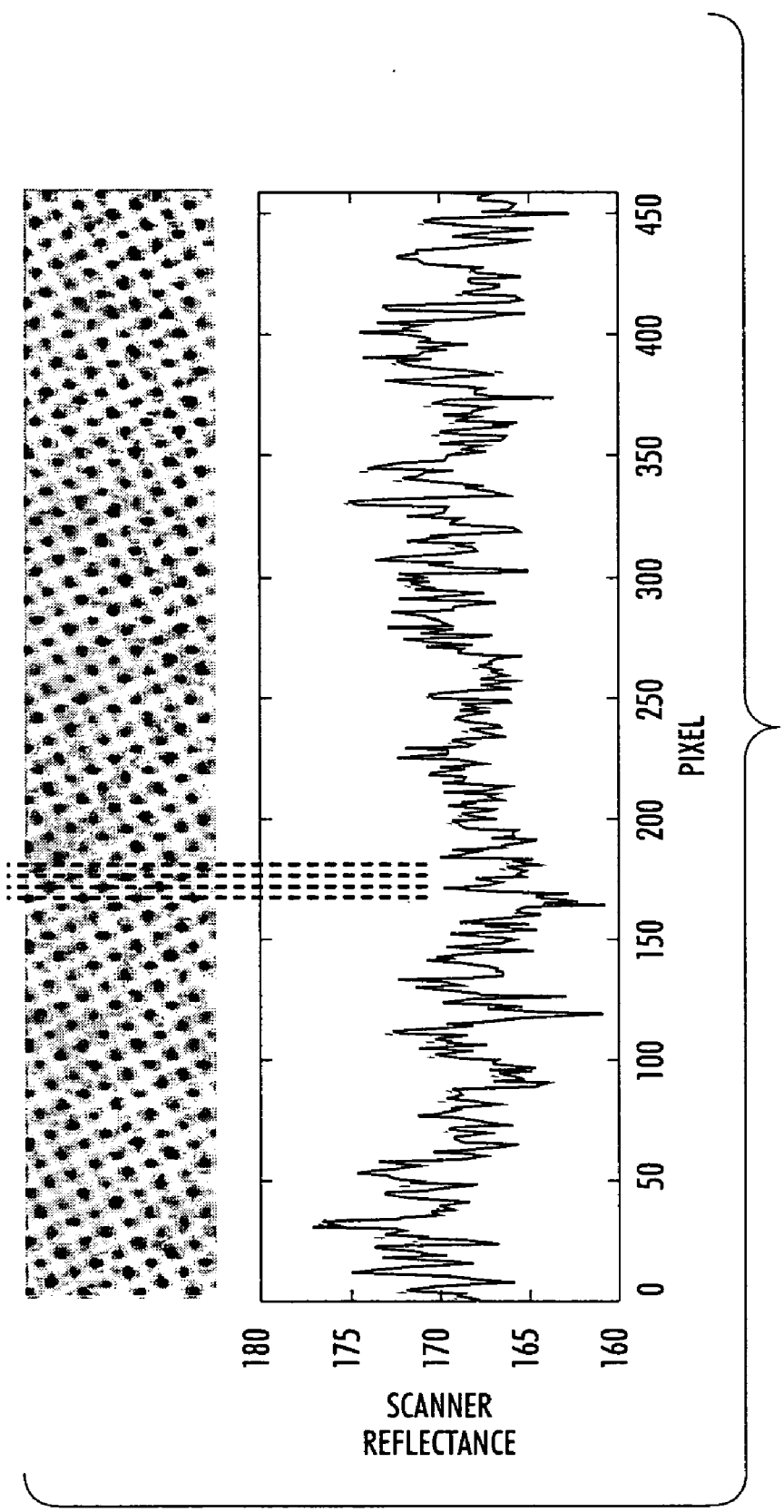
Figure 16A:
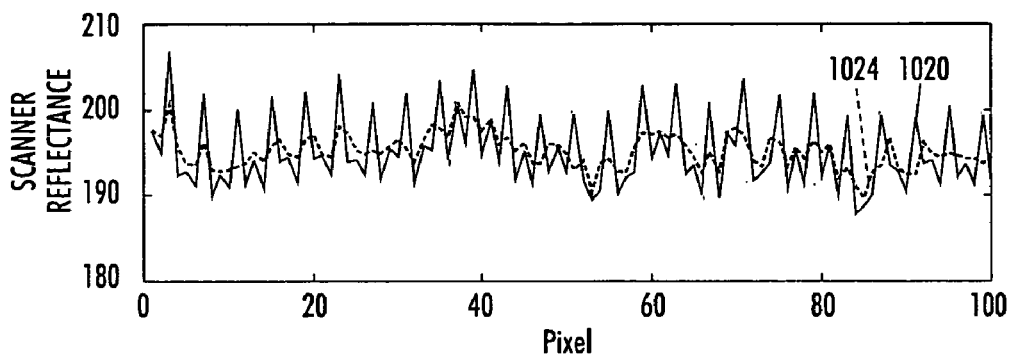
Figure 16B:
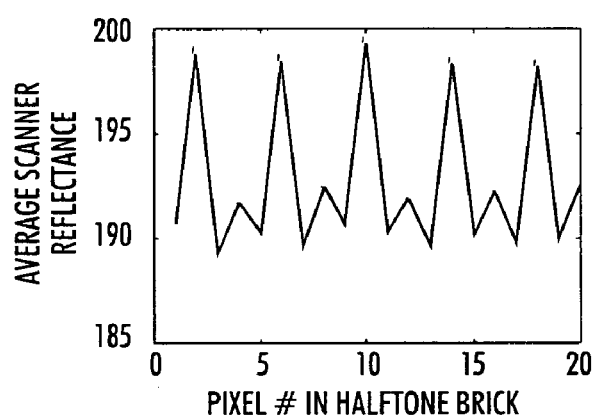
Figure 16C:
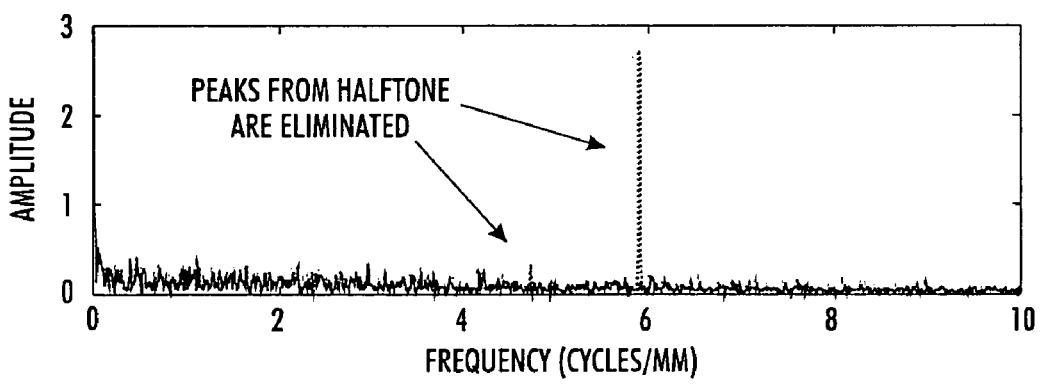

FIG. 14 displays typical cross sections for three fiducials;

FIG. 15 displays a high resolution cross section of a strip and the periodicity of dots and spaces contained therein;

FIG. 16A displays a graph of a cross section of a particular gray level;

FIG. 16B displays the result of performing an averaging process to extract a halftone contribution to the cross section; and, FIG. 16C displays an elimination of the halftone contributions using a Fourier transform.

DETAILED DESCRIPTION

While the method to process scanned images for uniformity will hereinafter be described in connection with exemplary embodiments, it will be understood that it is not intended to limit the embodiments. On the contrary, it is intended to cover all alternatives, modifications and equivalents as may be included within the spirit and scope of the embodiments as defined by the appended claims.

Figure 1:
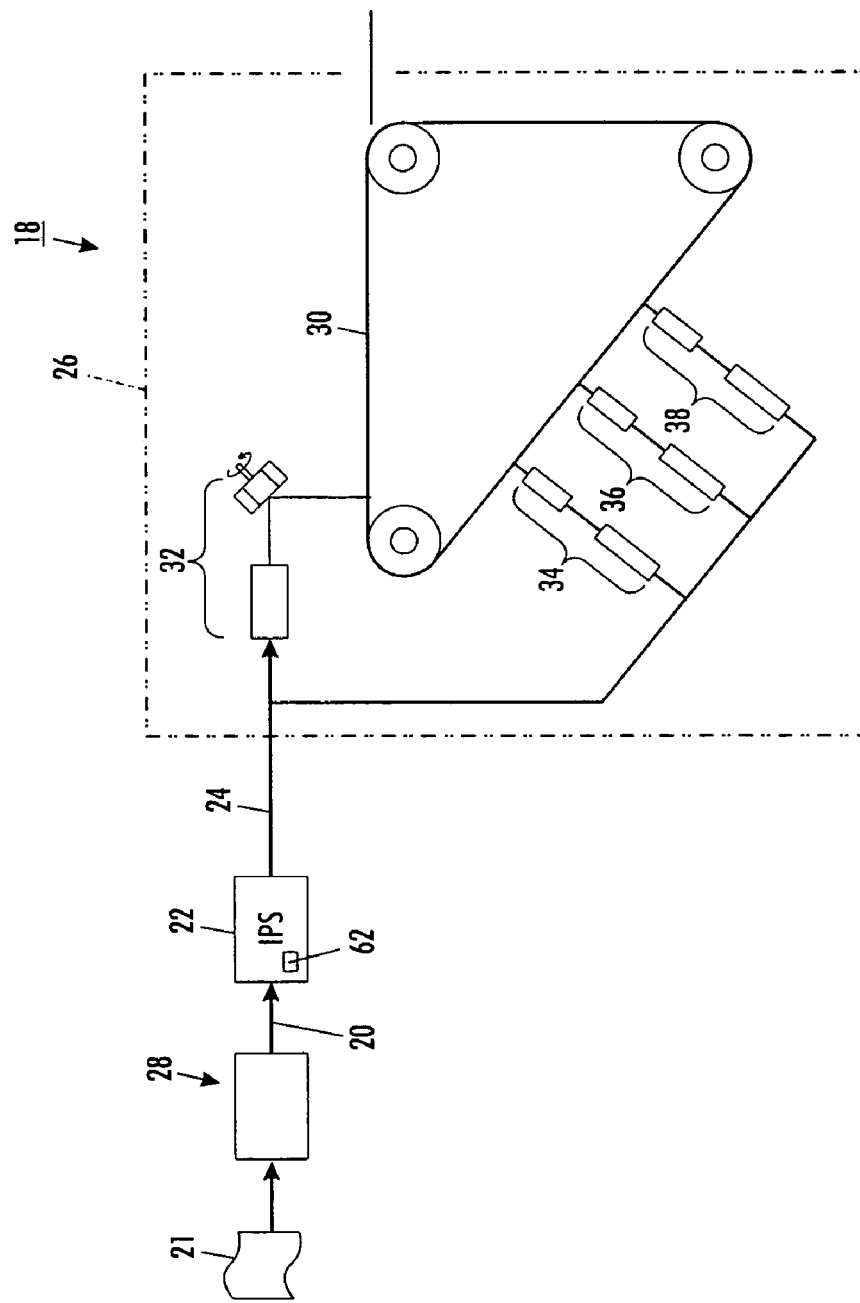
FIG. 1 illustrates a generalized representation of a suitable system level embodiment for one or more aspects of the exemplary embodiments.

Turning now to FIG. 1, there is shown an embodiment of a digital imaging system 18 that incorporates the features of the exemplary embodiments. Image data 20 representing an image 21 to be printed is received by an image processing system (IPS) 22 that may incorporate what is known in the art as a digital front end (DFE). The IPS 22 processes the received image data 20 to produce print ready data 24 that is supplied to an output device 26 (e.g., a print engine). It is to be understood that the output device 26 may be a color xerographic printer. The IPS 22 may receive image data 20 from a sensor (e.g., an input scanner) 28, which captures an image from an original document, a computer, a network, or any similar or equivalent image input terminal communicating with the IPS 22.

The print engine 26 is beneficially an electrophotographic engine; however, it will become evident from the following discussion that the exemplary embodiments are useful in a wide variety of digital copying and printing machines and are not limited in its application to the printing machine shown herein. The print engine 26 is illustrated as incorporating a raster output scanner (ROS) lens system 32 and three (3) array systems 34, 36, 38 for producing color. The engine 26, which operates on the print ready binary data from the IPS 22 to generate a color document in a single pass, selectively charges a photoreceptive surface in the form of a photoreceptor belt 30. Briefly, the uniformly charged photoreceptor 30 is initially exposed to a light image which represents a first color image separation, such as black, at the ROS 32. The resulting electrostatic latent image is then developed with black toner particles to produce a black toner image. This same image area with its black toner layer is then recharged, exposed to a light image which represents a second color separation such as yellow at the array lens 34, and developed to produce a second color toner layer. This recharge, expose, and develop image on image (REaD IoI) process may be repeated at the array lens 36, and the array lens 38 to subsequently develop image layers of different colors, such as magenta and cyan.

The methods, to be described in detail below, describe a series of image processing algorithms that allow a print uniformity to be sensed or monitored in the presence of scanning and printing defects or profile artifacts. Accurate image processing methods enable the print or spatial uniformity to be sensed and measured. One such method includes printing a test or compensation pattern from which the uniformity can be measured. The test pattern can be scanned on an image capture device, such as, for example, a flatbed scanner, that has process control marks and/or alignment marks (i.e. fiducials) before and/or after a halftone strip that extends across a process direction. The alignment marks provide alignment between a printer pixel grid and a scanning pixel grid. From this test pattern, and the associated printing defects, print uniformity can be monitored and sensed through the series of image processing algorithms.

Figure 2:
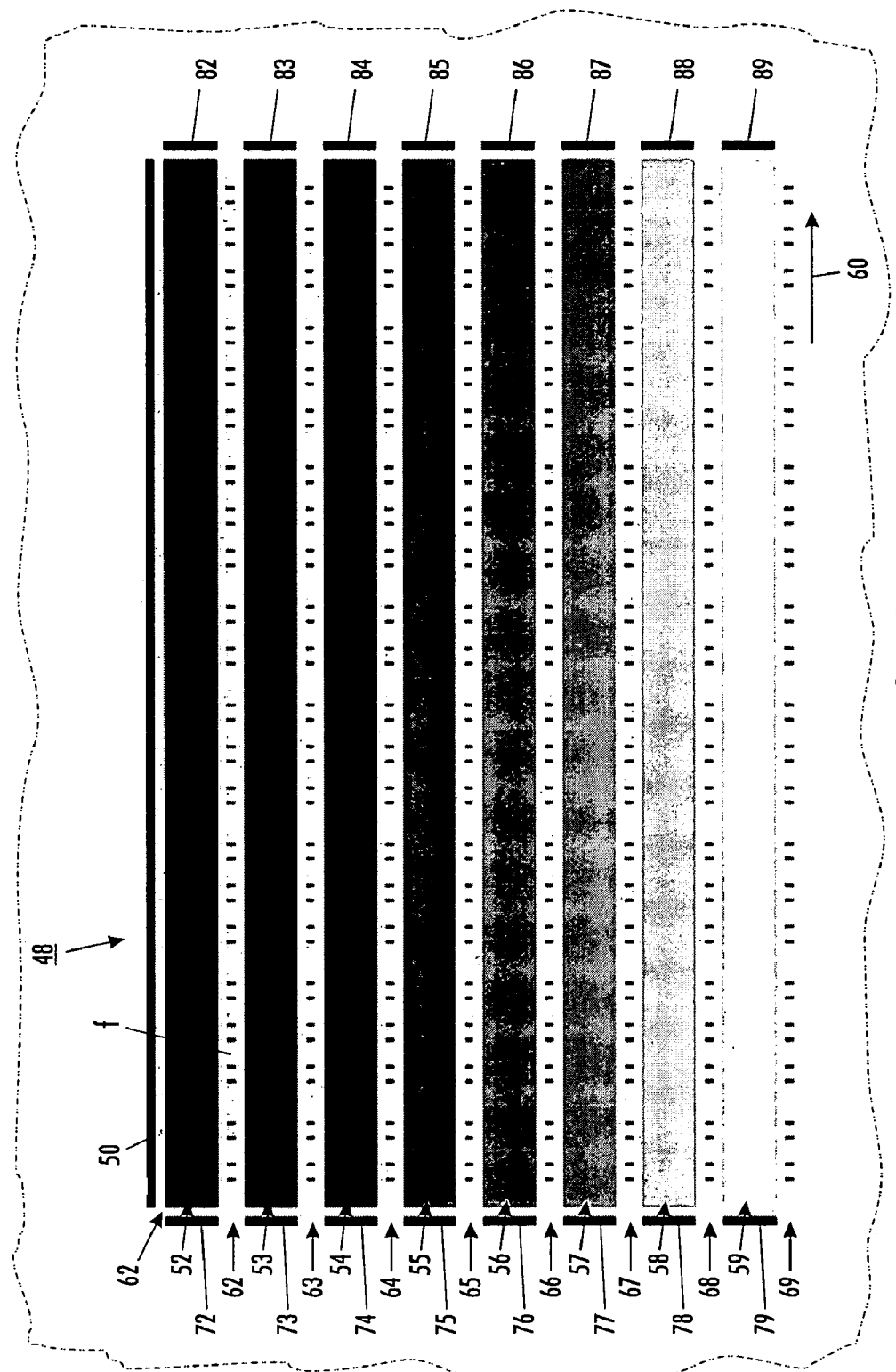
FIG. 2 is a test pattern for measuring cross process uniformity.

Referring now to FIG. 2, an example of the test pattern 48 to monitor cross process uniformity is therein shown. The test pattern can consist of an alignment bar or top line 50 and a series of strips 52, 53, 54, 55, 56, 57, 58, 59 that extend across the cross process direction 60. In between each strip is a series of fiducial marks 62, 63, 64, ... 69. The fiducial marks are thin dashes printed in known positions with a regular spacing. The image can also have side fiducial marks 72, 73, 74, ... 79, and 82, 83, 84, ... 89. The side fiducial marks can be used to help identify the location of the strips. A measurement of the scanner response of the strip as a function of position will give the uniformity of that strip. The fiducials are used to transform a cross process position from scanner coordinates to digital image coordinates as described in more detail below. The fiducials can be used to determine the distance (i.e. x pixels) from, for example, a left edge.

Figure 3:
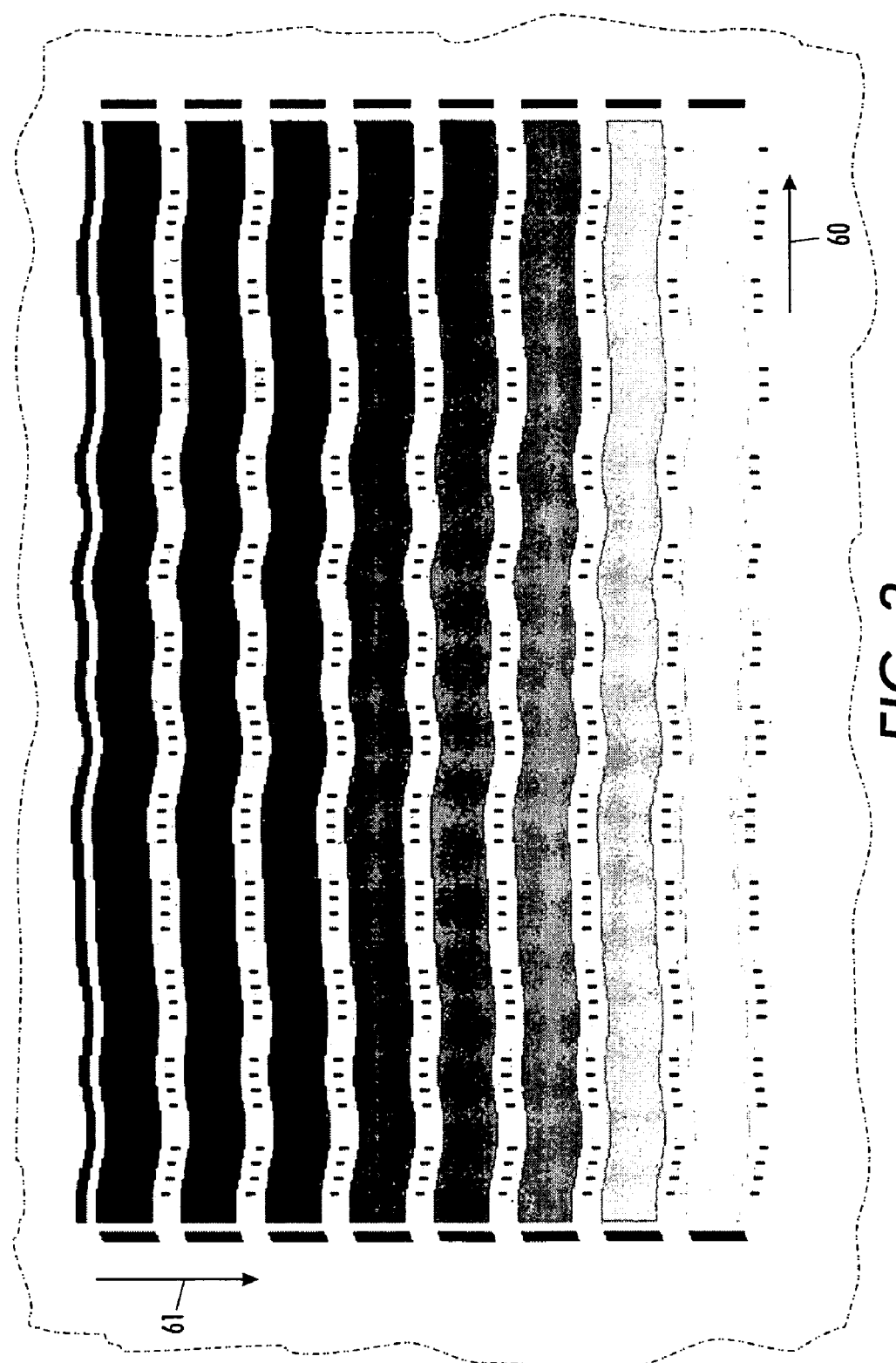
FIG. 3 is a test pattern displaying an image showing waviness in the process direction.
Figure 4:
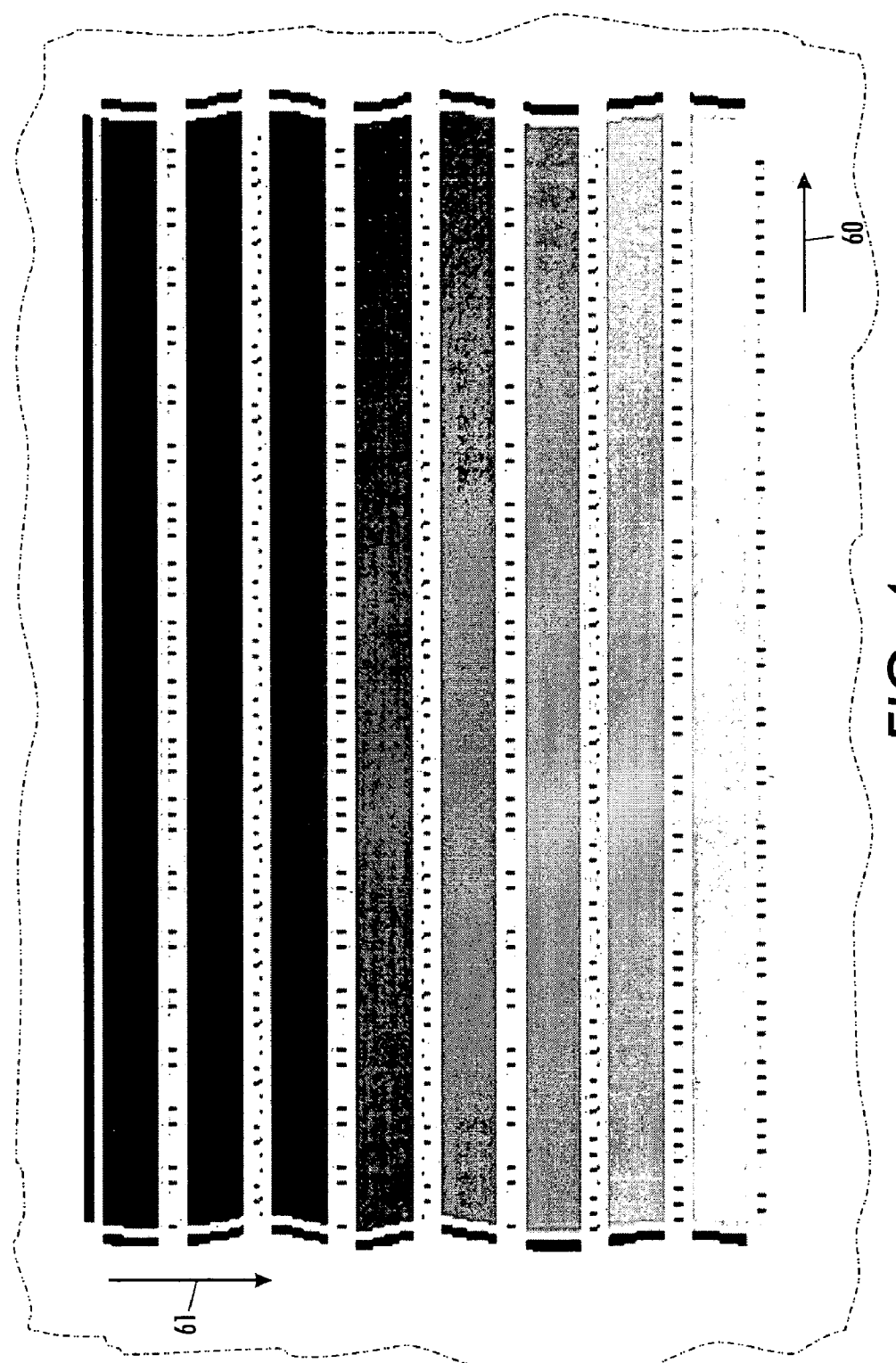
FIG. 4 is a test pattern displaying an image showing waviness in the cross process direction.
Figure 5:
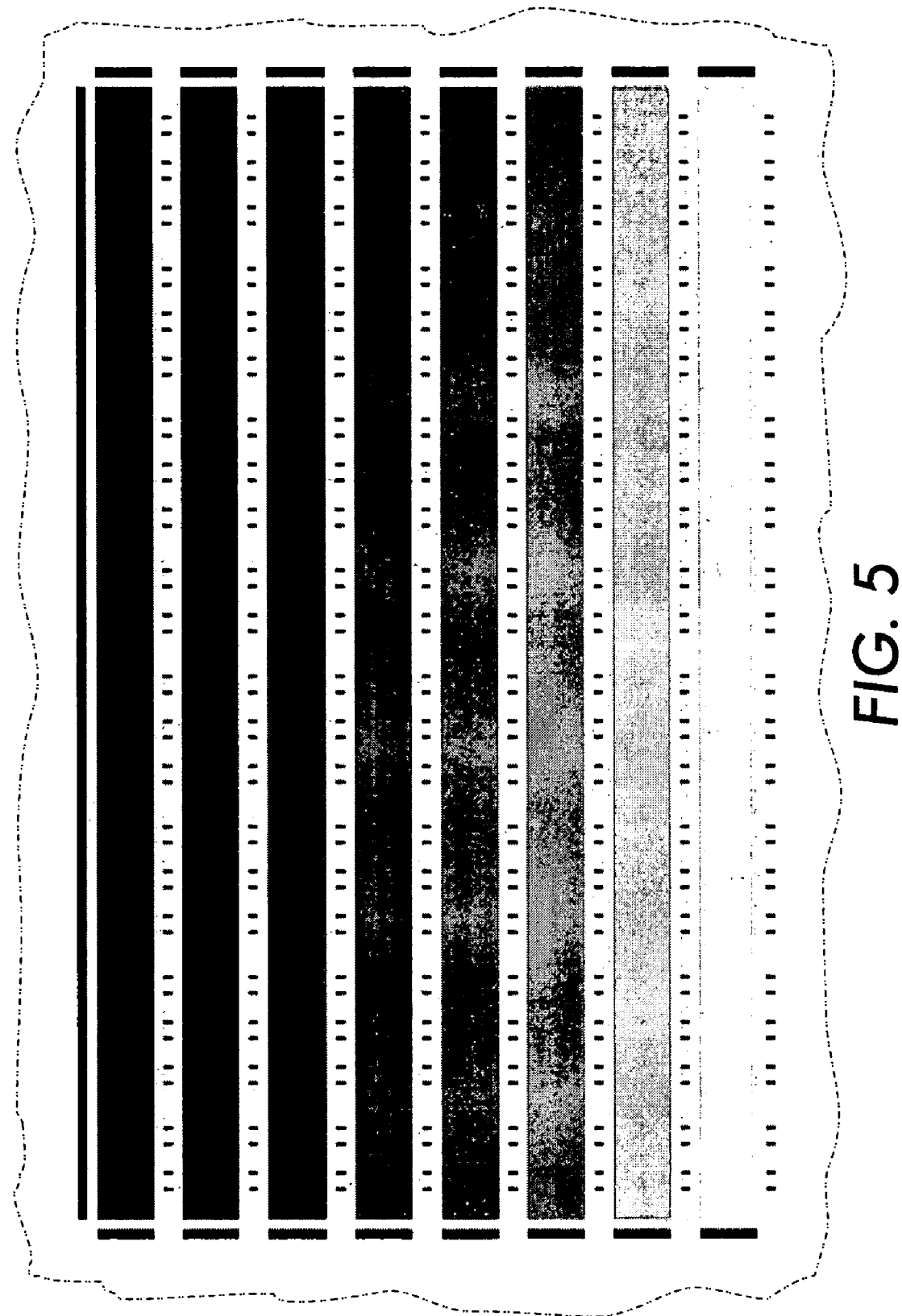
FIG. 5 is a test pattern displaying an image showing rotational defects.
Figure 6:
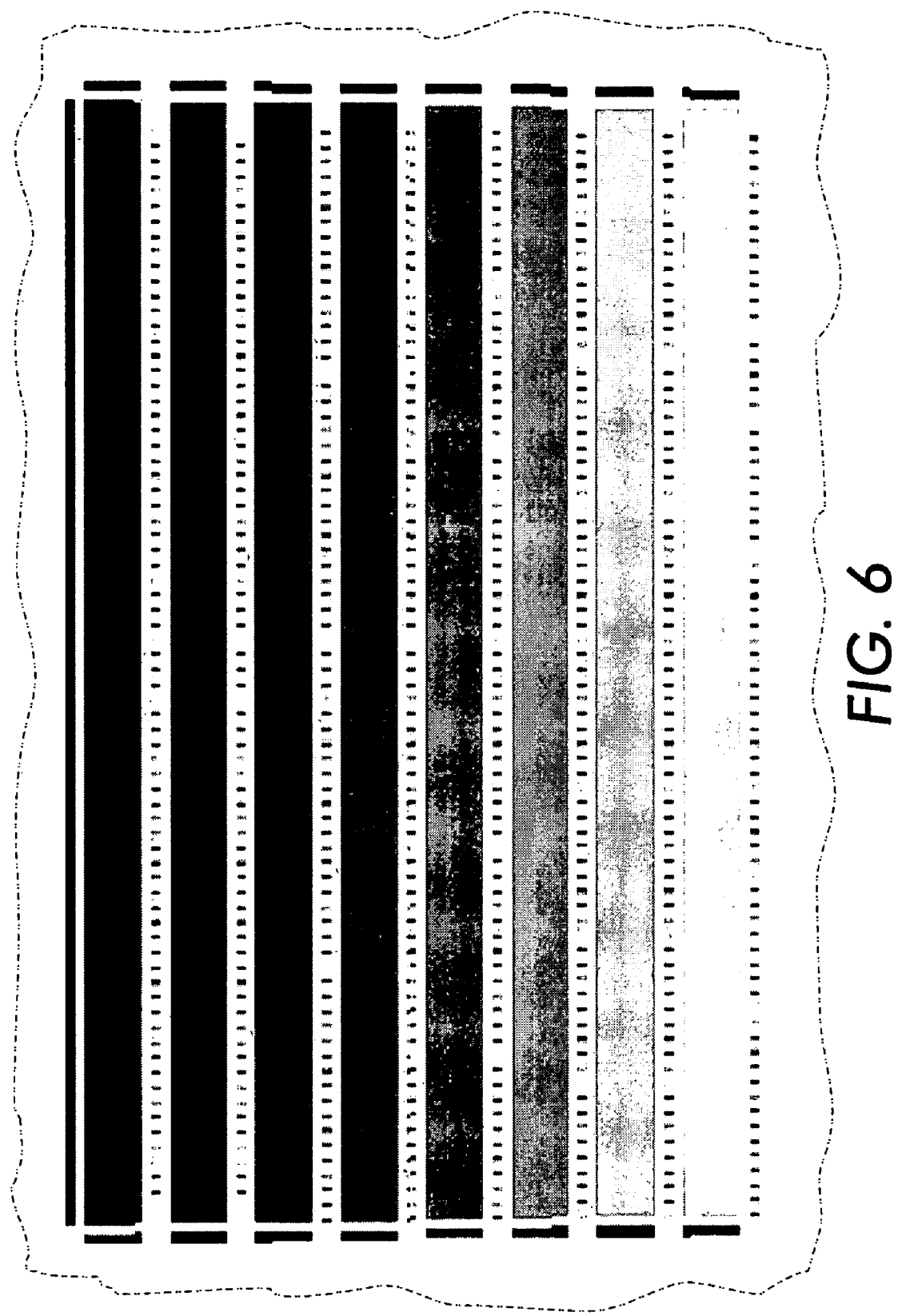
FIG. 6 is a test pattern displaying an image showing expansion wherein the bottom of the image is unequal to the top of the image.
Figure 7:
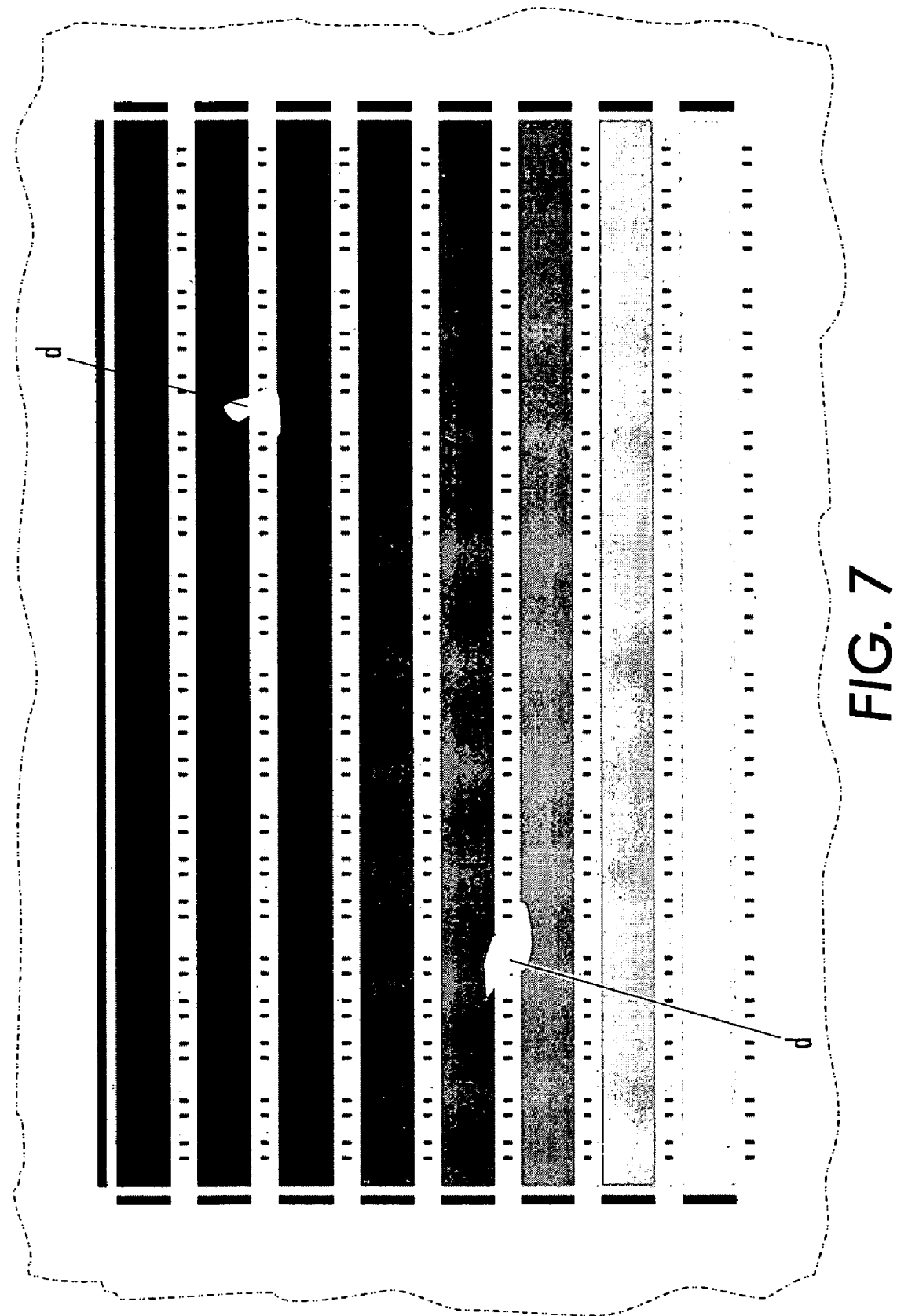
FIG. 7 is a test pattern displaying an image showing random deletions.
Figure 8:
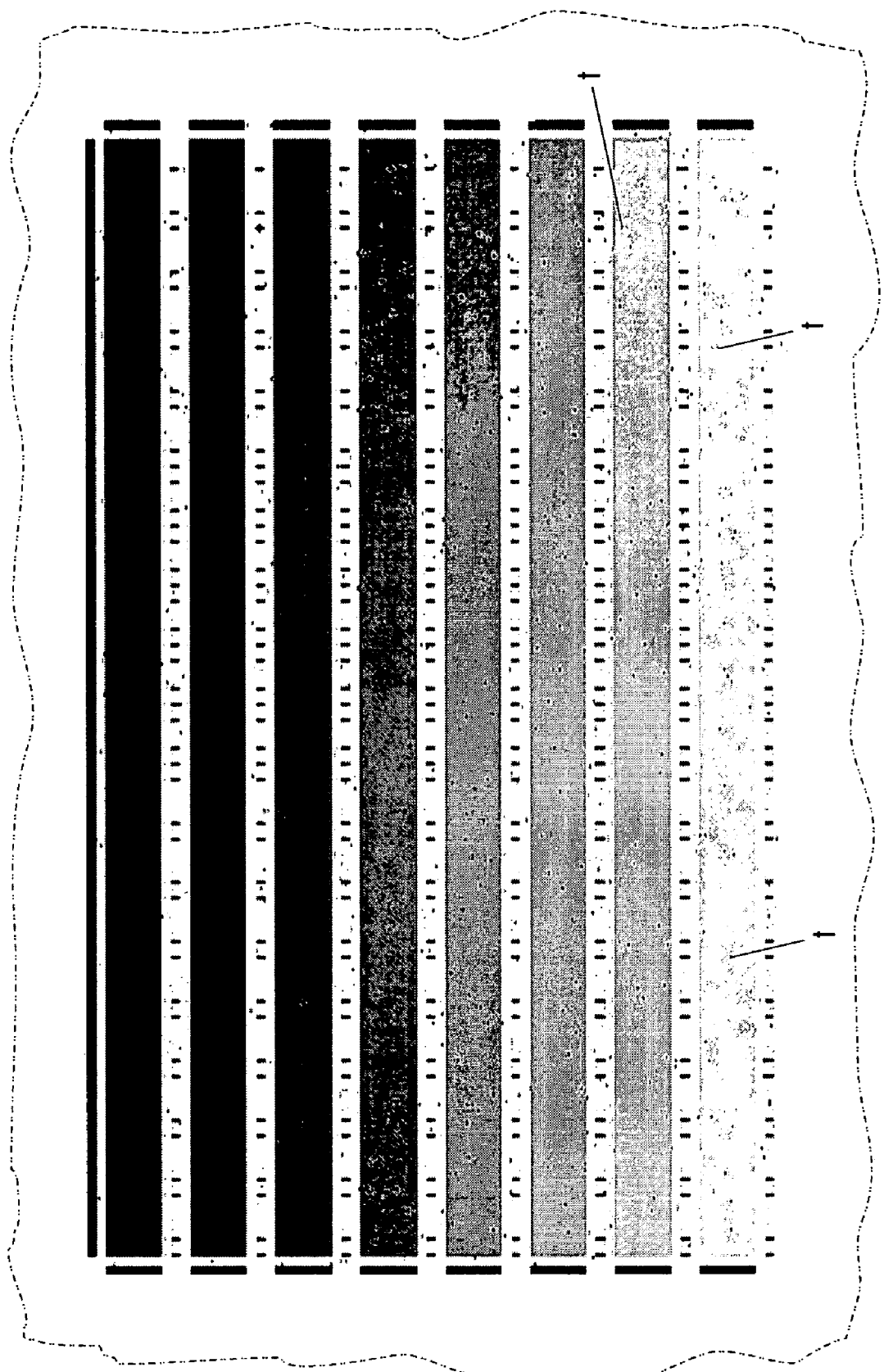
FIG. 8 is a test pattern displaying an image showing background noise or stray marks.
Figure 9:
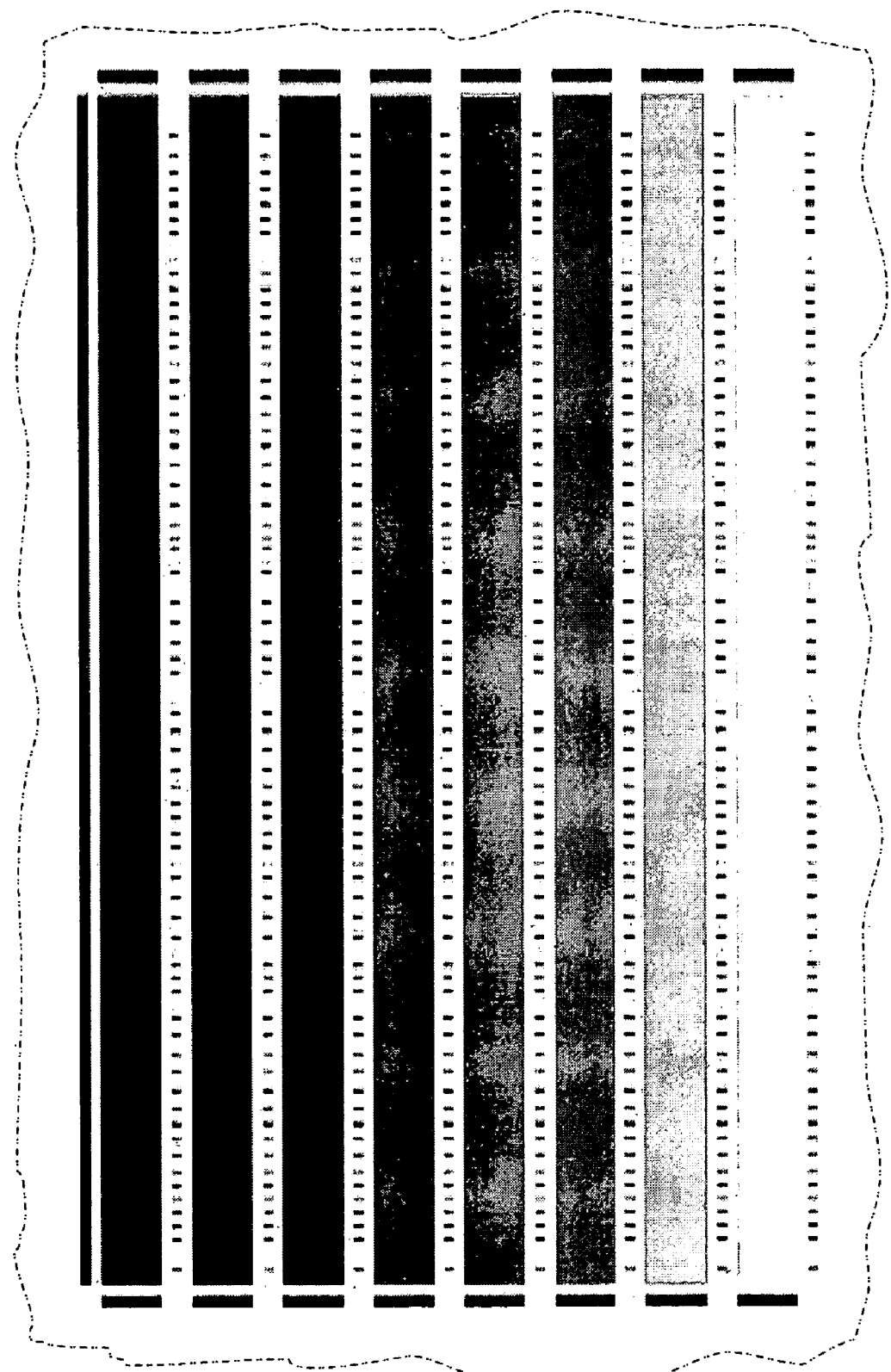
FIG. 9 is a test pattern displaying an image showing distortion of the image that can occur when scanned with a flatbed scanner with poor motion quality.

FIGS. 3-9 show exaggerations or representations of various types of image defects to which the image processing algorithms can be particularly adapted or robust. The image defects shown in FIGS. 3-9 are by way of example only and are not to be construed as limiting the method to these defects. Specifically, FIG. 3 shows an image displaying waviness in the process direction 61 which can occur for direct marking systems with poor alignment of the time of flight of the individual nozzles. FIG. 4 shows an image displaying waviness in the cross process direction 60 which can occur for (ROS) based imaging systems with jitter or another source of start of scan position error. FIG. 5 shows an image with rotation which can either occur when the page is placed on the scanner platen or can occur during poor registration during the transfer of the image to paper. FIG. 6 shows image expansion where the bottom of the image can be wider than the top of the image. FIG. 7 shows image deletions d. FIG. 8 shows background noise where the algorithm still needs to identify the location of the fiducials under conditions where it may be confused about what is a fiducial and what is background toner t. FIG. 9 shows a distortion of the image that can occur when the image is scanned with a flatbed scanner having poor motion quality. The algorithm, to be described hereinafter, is adaptable to process an image despite the aforementioned image effects.

Figure 10:
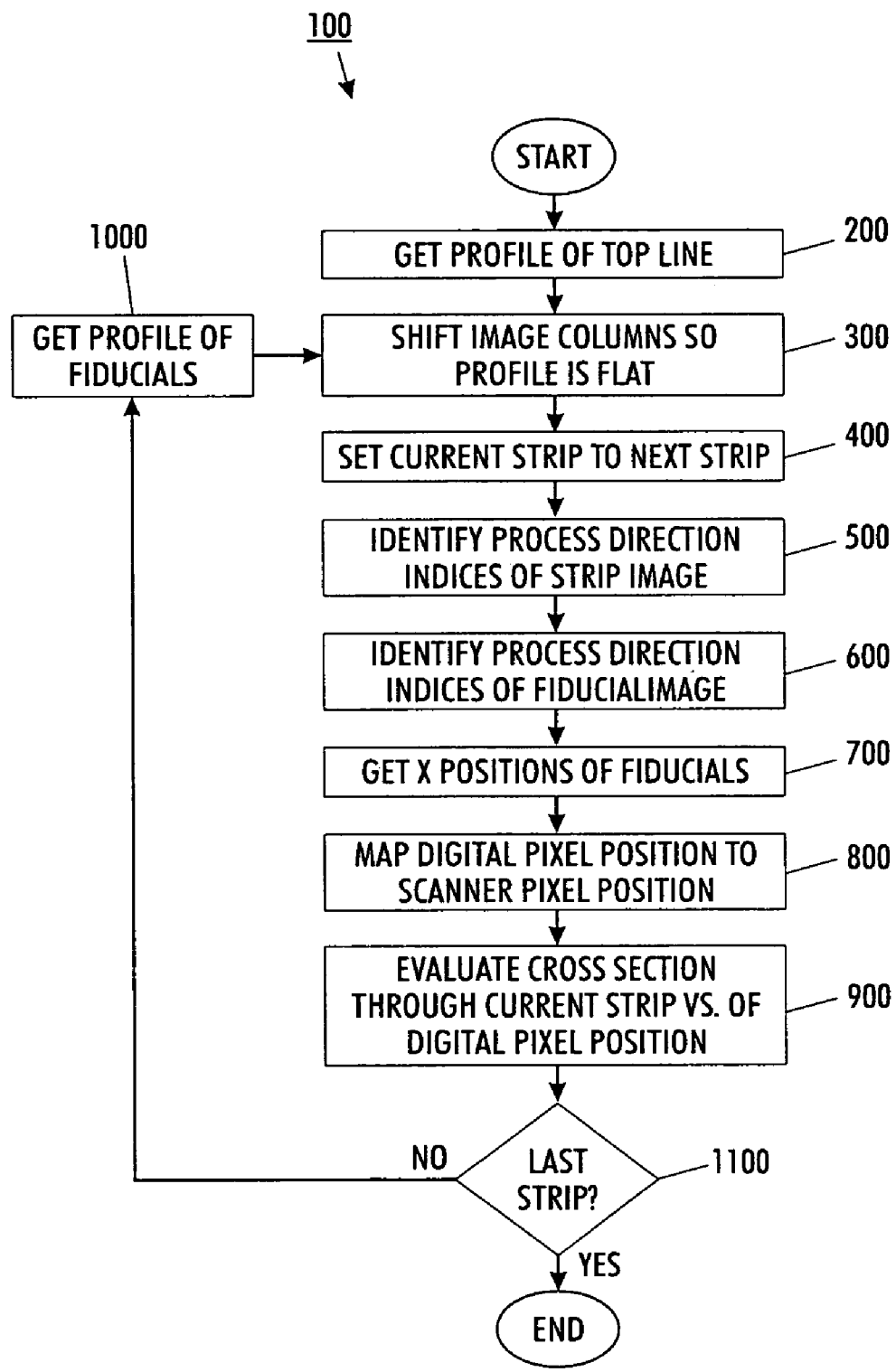
FIG. 10 is a flowchart displaying the analysis algorithm for sensing a scanned image for uniformity.

Referring now to FIG. 10, wherein the analysis steps or image process algorithm 100 is therein described beginning at start. As described in step 200, the process direction displacement as a function of cross process position of the top line 50 running across the top of the image is determined. The steps to extract a profile, process direction displacement as a function of cross process position, of the top line 50 will be described in more detail hereinafter and are displayed in the flowchart of FIG. 10. One aspect of the exemplary embodiments is to identify the darkness or optical density of each strip 52, 53, 54, ... 59 as a function of distance from a reference point in the test pattern 48.

While making reference to the test pattern of FIG. 2, the steps detailed in FIG. 10 will be described. As detailed in step 300, each pixel column of the image can be shifted in the process direction to force the top line 50 to be substantially horizontal. In the next set of steps, beginning with step 400, each subsequent strip 52, 53, 54, ... 59 will be analyzed in sequence, starting with a first strip 52, i.e. the first strip below the top line 50. It is to be appreciated that the first strip can be the top line. In steps 500 and 600 the location of the first strip 52 and a row of fiducials 62 below that strip are identified. There can be at least two ways to identify these locations. In the test pattern 48 of FIG. 2, there is a solid side line to the left and right (i.e. left and right side fiducials 72, 82) of the first strip 52. A cross section of the solid side line 72 will show a transition at the top of the solid side line 72*t* and at the bottom of the solid side line 72*b*. This gives the top boundary and the bottom boundary of the first strip 52. It is to be appreciated that the fiducials 62 are adjacent to this strip 52 and the dimensions of the test pattern 48 are known, thus the top boundary and bottom boundary of the row of fiducials can also be accurately estimated.

If the uniformity across the full printable area is needed, it may not be possible to print the side fiducials 72, 73, 74, ... 79, and 82, 83, 84, ... 89 at the left and right side of the test pattern 48. Alternatively then, for dark strips, for example 52, 53, 54, 55, one can use the strip itself to identify the top and bottom boundaries. For light strips, for example 56, 57, 58, 59, the presence of any sort of noise may cause errors in locating the position of the strips. Under these conditions, the position of the row of fiducials 66, 67, 68, 69 in the process direction can be used to estimate the position of the strips 56, 57, 58, 59. Specifically, the periodic pattern of the fiducials can be used to identify them with high precision. A single scan line in the cross process direction that runs through the fiducials will show a periodic response at the period of the fiducials and a Fourier Transform at this frequency will be large. A scan line running through the paper or through the strip will not have this periodicity. Therefore, a plot of the amplitude at this periodic frequency, as a function of scan line, will have a series of peaks at the positions of the fiducials. The positions of the strips 52, 53, 54, ... 59 can then be inferred from the positions of the fiducials 62, 63, 64, ... 69.

Figure 12:
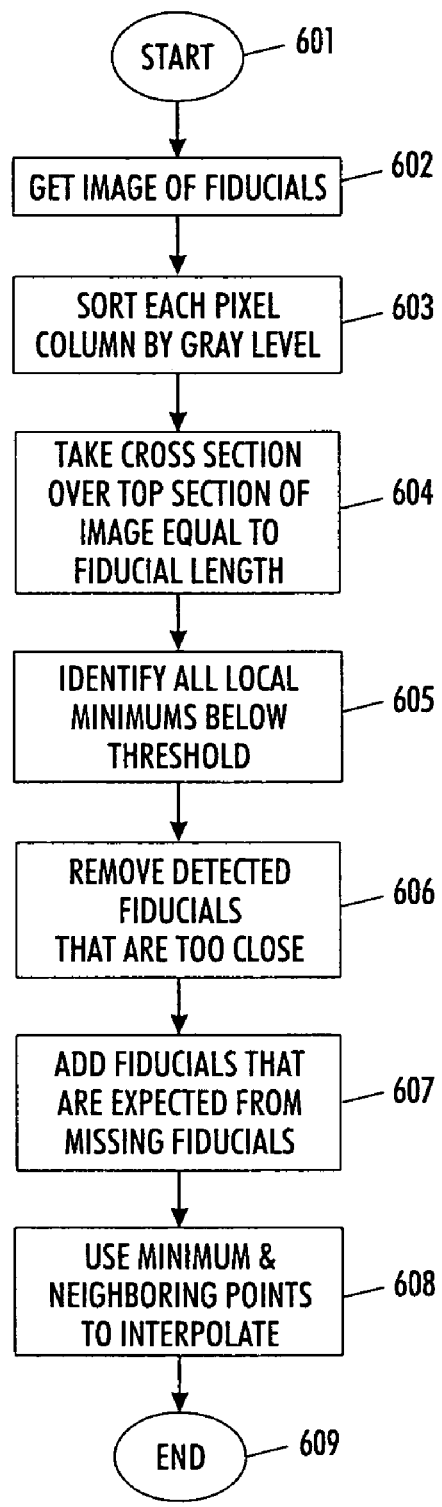
FIG. 12 is a flowchart detailing the steps for obtaining a cross process position of fiducials.

In steps 600 and 700, the cross process position of each fiducial in the row of fiducials below the current strip is determined. The technique to do this identification in the presence of noise is described hereinafter and shown in more detail in the flowchart of FIG. 12.

In step 800, a mapping or calibration function that translates or generates the cross process position in the digital image to the cross process position in the scanned image is determined. The mapping function is a plot of the position of the fiducials in the digital image to the position of the fiducials in the scanned image. Linear interpolation can be utilized between measured points to give a continuous calibration curve.

In step 900, the strip profile is determined. For each cross process digital image pixel column, the corresponding cross process position is determined for the scanned image. The sum over the strip width for the pixel column to the left and to the right of the cross process position is determined. Linear interpolation between these two sums is performed based on how far the corresponding cross process position is between the two pixel columns.

Figure 13:
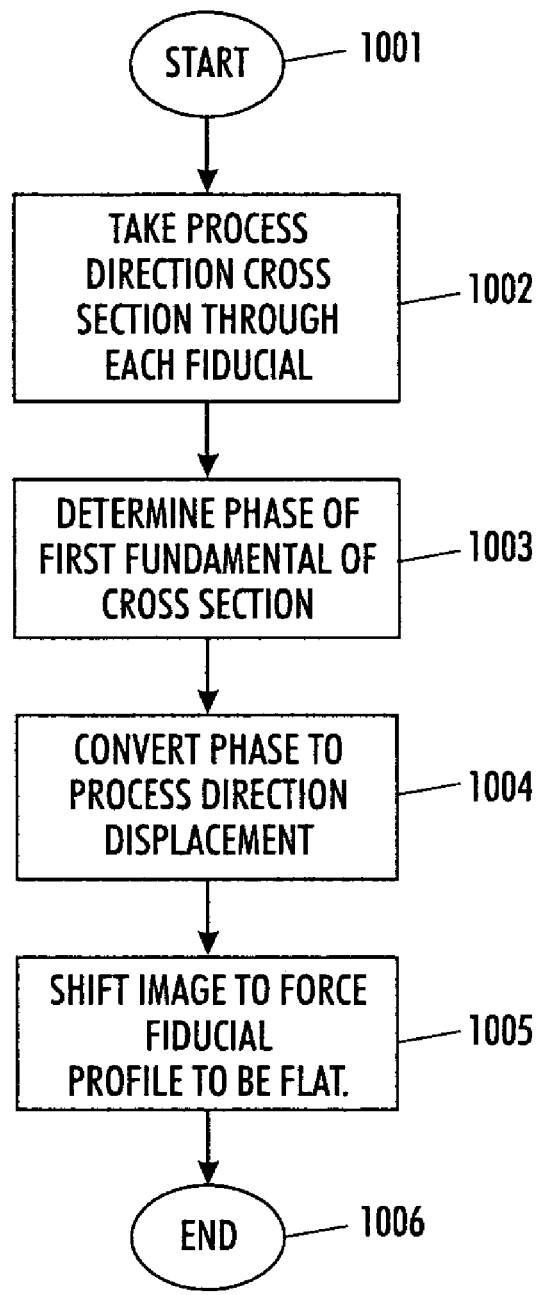
FIG. 13 is a flowchart detailing the steps for checking the alignment of fiducials.

If this is the last strip of the image, then the algorithm is finished and the profile of each strip is returned. However, if this is not the last strip, the rotation of the current row of fiducials can be determined. If the only distortions of the image shown in FIG. 3 (process direction waviness) and FIG. 5 (image rotation) occur, the row of fiducials should show no rotation. However, if there is an expansion or compression of the image (FIG. 6), coupled with a rotation, then the row of fiducials will be slightly rotated. The technique to determine the rotation of the row of fiducials is described and shown in the flowchart of FIG. 13. If the current row of fiducials is found to be rotated, then each pixel column is shifted an appropriate amount so that the current row of fiducials becomes horizontal. The current strip and the row of fiducials below that strip are then removed from the image. The next strip becomes the top strip and the top of the image. Analysis then continues per steps 300, 400, 500, . . . 900, as described above.

Figure 11:
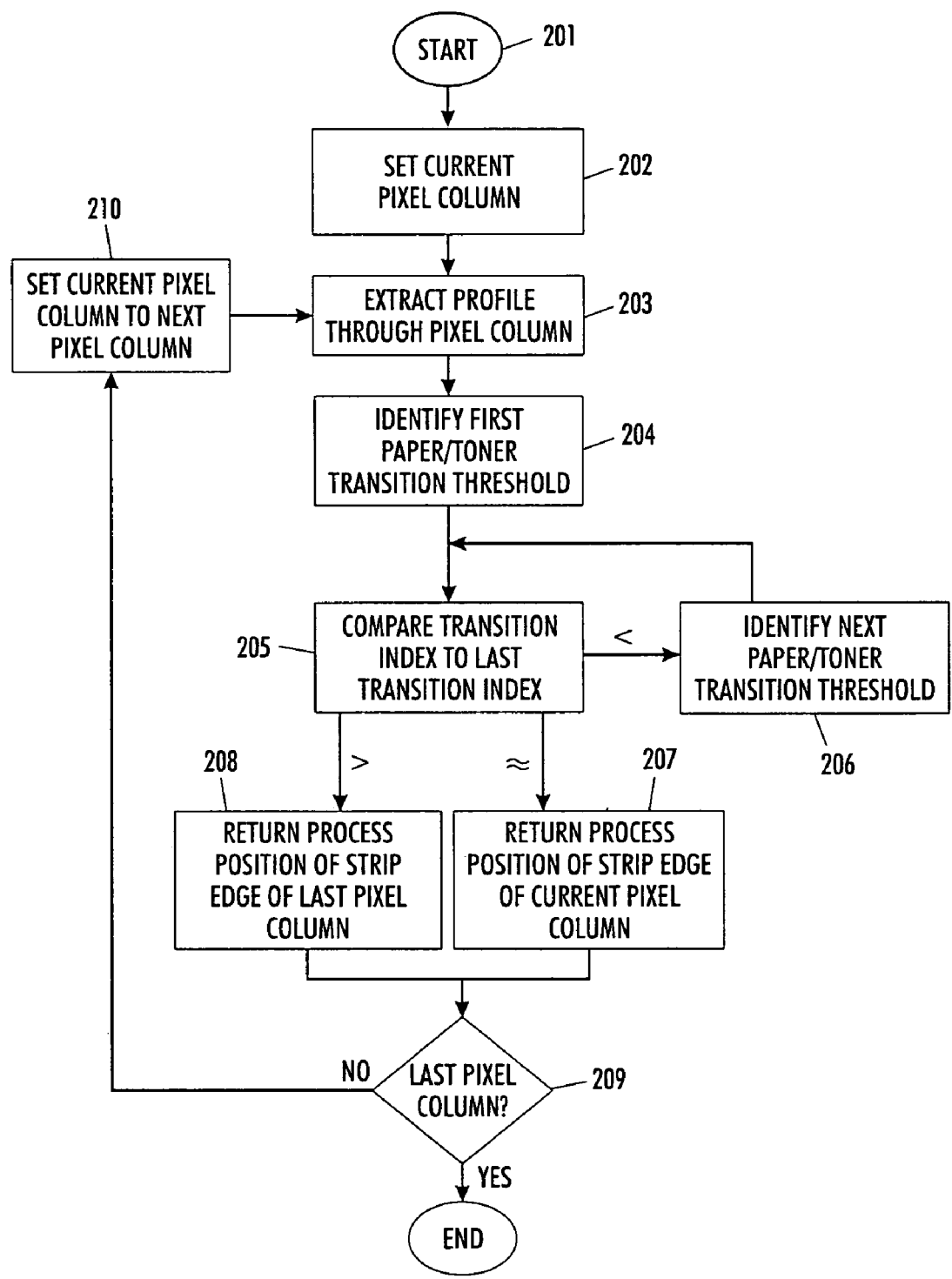
FIG. 11 is a flowchart detailing the steps for obtaining the profile of a top solid strip.

Referring again to FIG. 11, the algorithm to determine the profile of the alignment bar or top line is therein detailed and can be somewhat complicated by the need to determine the profile when there is process direction waviness (FIG. 3) or image noise present (FIG. 8). The profile of the top line can be found by analyzing the pixel columns in sequence, starting from the left side of the image and proceeding to the right side of the image. In step 202, the current pixel column is set. The profile of scanner reflectance vs. cross process direction position is extracted in step 203. The scanner response to the blank paper and the scanner response to a solid patch have been previously determined and a threshold is set intermediate between these two values. In the current profile, the first transition to cross the threshold is determined in step 204. The index of this transition is compared to the index of the last transition in step 205. If both transitions occurred at the horizontal test pattern strip, then they will differ by only a few pixels and processing will continue to step 207. However, if there is background toner above the horizontal strip, then the transition of the current strip will be incorrect. The algorithm will proceed to step 206 where the next transition is identified before proceeding back to step 205. If there is a gap in the horizontal line, then the transition will occur at the test pattern strip. In this situation, the index will differ greatly than that for the previous pixel column, so the algorithm returns the index of the last pixel column in step 208. In step 209 and step 210, processing continues to the next pixel column unless this is the last pixel column wherein the algorithm now has determined the profile of the horizontal strip at the top of the test pattern.

Referring again to FIG. 12, the algorithm to obtain the cross (x) process position of the fiducials is therein outlined and can also be complicated by the requirement that it function in the presence of image noise. The algorithm begins in step 601 where it operates on a subsection of the image which contains only the thin strip consisting of the current row of fiducials in step 602. Because of process direction waviness, the fiducial positions can vary slightly in the process direction. For each pixel column, the data is sorted in step 603 from the darkest pixel to the lightest pixel. After this sorting, the fiducials are now aligned at the top of the image. In step 604, the cross section over the top section of the image over a region equal to the known fiducial length is taken. This cross section results in a profile that shows a series of negative pulses at the positions of the fiducials. This cross section can be filtered with a low pass filter (described in more detail below) to remove structure along the profile caused by printer noise.

The index of the pulse positions are identified by finding all the local minimums of this profile in step 605. The local minimum exists below some threshold (to distinguish it from noise due to paper fibers). Because of background toner t such as illustrated in FIG. 8, false minimums may be detected in the profile. These can be distinguished because the measured spacing between the local minimums differs from the expected spacing between the local minimums. When these points are identified, they are removed as an identified fiducial mark in step 606.

Because of deletions d as illustrated in FIG. 7, some fiducial marks may not print. Step 607 identifies where these occur in the image. These can be identified because no local minimum is seen at the expected spacing. It is to be appreciated that the algorithm processes the fiducials from left to right. Starting from the first fiducial, the algorithm looks for the next fiducial in the vicinity of where it is expected. If the algorithm finds a fiducial, then it keeps stepping across the series of fiducials. If no fiducial is in the vicinity, then a false fiducial is placed at this location and the algorithm keeps processing the data, adding false fiducials until it locates the next imaged fiducial. After step 607, the locations of the fiducials have been identified to the resolution of the scanner. Step 608 more accurately finds the location of the fiducials by interpolation. The gray levels at the minimum responding pixel in the profile and the two neighbors are fit with a quadratic function. The location of the minimum of the quadratic function is returned as the location of the pixel. The set of fiducial positions are returned in step 609.

Because of compression or expansion of the image (refer to FIG. 6) that can occur for some printers, at each step, the image is readjusted so the current strip remains horizontal. This is done by checking if the row of fiducials is horizontal. Processing for this check is outlined in FIG. 13 beginning with step 1001. The cross process position of each fiducial is already known to the algorithm from previous processing. The process direction cross section is taken through the center of each fiducial and the gap in between the fiducials and the strips in step 1002. Typical cross sections for three fiducials are shown in FIG. 14. The cross sections consist of a single cycle of period of the length of the cross section. The phase of this cycle is calculated in step 1003. In step 1004 the phase is converted to a process direction displacement with the knowledge that a phase shift of $2\pi$ equals the length of the cross section. If the measurement shows that a plot of the fiducial index vs. fiducial position is not horizontal, then the pixel columns of the image are shifted to force the profile to be horizontal in step 1005. The algorithm returns to the main algorithm in step 1006.

A high resolution descreening technique can be employed to make high resolution corrections to the image. FIG. 15 shows a high resolution cross section of the strip, as seen in the upper part of FIG. 15. For a clustered dot pattern, a halftone brick exists. For some halftones, a cross section through this brick will alternatively pass through dots and spaces, i.e. halftone dot spacing, in between the bricks. The cross section will show the resultant periodicity, as seen in the lower part of FIG. 15. This periodicity must be eliminated from the cross section. The dot and space pattern from the halftone is what has given rise to the test pattern. Getting rid of it directly will have the effect of the algorithm trying to make the dots get smaller and the spaces in between the dots get darker. This is impossible and the algorithm will become unstable.

Descreening is the name of a technique to remove the cross section periodicity. Descreening algorithms can be used in input scanners where the halftone of the printed image is not desired in the color scan. The way descreening typically works is to perform an average of the input pixels over an area the size of the halftone dot spacing. However, an algorithm performed in this way will blur the image. For bitmap compensation of streaks, blurring of the image is undesirable. If the blurring of the image is too severe, the compensation will not be able to compensate for the sharp edges in a uniformity profile as well as extremely narrow streaks.

The exemplary embodiments take a different approach to descreening. The cross section of the strip can be thought of as a halftone structure superimposed upon the true nonuniformity across the strip. The periodicity of the halftone in the cross section is equal to the dimension of the halftone brick in the cross process direction. The strips are long, so the halftone repeats many times across the cross section. To extract a halftone contribution to the cross section, the gray level for the same pixel in the halftone brick can be averaged across the whole cross section. To be specific, assume the halftone brick is 10 pixels long. Therefore, we calculate 10 numbers. The first is the average of the gray level at indices 1, 11, 21, 31, . . . in the cross section. The second is the average of the gray level at indices 2, 12, 22, 32, . . . in the cross section. The last is the average of the gray levels at indices 10, 20, 30, 40, . . . in the cross section.

The streaks in the image arising from the subsystems should be uncorrelated with the halftone. Therefore, the gray level when averaged over every 10th index should tend to be independent of the nonuniformity. What is left over then is the contribution of the halftone. Once the halftone contribution is determined, it is subtracted from the signal, leaving only the true nonuniformity signal. This algorithm is shown graphically in FIG. 16a. Line 1020 in FIG. 16a shows the cross section of a particular gray level. The strong variation with a periodicity of four pixels is therein shown. FIG. 16b shows the result of performing the averaging process described above. This is the contribution from the halftone. Line 1024 in FIG. 16a is the result of extracting or subtracting the halftone contribution from the signal. It shows a virtually complete elimination of the halftone frequency without blurring of the signal. The elimination of the halftone contributions can also be seen with the Fourier transform shown in FIG. 16c.

Alternatively, another method to exclude the halftone contribution to the cross process uniformity is to apply a series of notch filters. A notch filter attenuates frequencies in the vicinity of a chosen frequency (the notch) and passes other frequencies. A series of notch filters will attenuate all frequencies at the frequency of the notches. The frequency of the halftone in the cross process direction can be determined from the digital image or from the Fourier transform of a typical profile of a uniform strip. There may be more than one frequency at which the halftone repeats. Techniques well known in the field of signal processing can be used to define a notch filter or a series of notch filters that eliminates the halftone frequencies but passes other frequencies. A kernel is a profile in real space derived from the notch filter that when convoluted with the signal will result in a filtered cross process uniformity profile that does not contain the contribution from the halftone at the halftone repeat frequency. If there is more than one halftone repeat frequency, the kernels from the series of notch filters can be applied in sequence. Suboptimal application of the notch filters could result in profile artifacts. These might include a phase shift of the signal, which would shift the detected position of a streak in the cross process direction. These might also include edge effects, where artificial oscillations and/or noise are introduced at the edge of the profile. These might still also include artificial periodic oscillations at the cutoff frequencies of the notch filter. Techniques known in the field of signal processing can be applied to minimize these artifacts.

Still another method to exclude the halftone contribution to the cross process uniformity is to apply a low pass filter. A low pass filter attenuates frequencies above a chosen frequency and passes frequencies below a chosen frequency. The frequency of the halftone in the cross process direction can be determined from the digital image or from the Fourier transform of a typical profile of a uniform strip. There may be more than one frequency at which the halftone repeats. Techniques well known in the field of signal processing can be used to define a low pass filter that eliminates frequencies at and above the halftone frequencies but passes other frequencies. A kernel is a profile in real space derived from the low pass filter that when convoluted with the signal will result in a filtered cross process uniformity profile that does not contain the contribution from the halftone at the halftone repeat frequency. Suboptimal application of the low pass filters could result in profile artifacts. These might include a phase shift of the signal, which would shift the detected position of a streak in the cross process direction. These might also include edge effects, where artificial oscillations and/or noise are introduced at the edge of the profile. These might still also include artificial periodic oscillations at the cutoff frequencies of the low pass filter. Techniques known in the field of signal processing can be applied to minimize these artifacts.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for measuring spatial uniformity in an image, comprising:
   printing a test pattern from an image forming device including a plurality of strips and rows of fiducials proximal thereto;
   correcting for distortions in an image caused by printing and scanning artifacts;
   mapping from scanner coordinates to digital image coordinates;
   determining a gray level of each strip in said plurality of strips as a function of digital image cross process coordinate;
   filtering a profile of said each strip whereby said artifacts from a halftone screen are eliminated;
   wherein said rows of fiducials are selected for said correcting of said distortions;
   wherein said correcting of said distortions further includes:
      determining a process direction cross section of each fiducial in a selected row of fiducials;
      determining a process direction shift of said each fiducial in said selected row of fiducials; and,
      shifting a pixel column of said image to adjust said each fiducial in a horizontal orientation in said selected row of fiducials whereby said selected row of fiducials is adjusted to a substantially horizontal orientation;

filtering a profile of said each fiducial in said selected row of fiducials including:

analyzing each pixel column in a sequence starting from one side of said image and proceeding to the other side of said image including identifying a current process direction transition index where a transition from high scanner response to low scanner response occurs;

comparing said current process direction transition index to a previous process direction transition index;

identifying a next process direction transition index;

identifying a phase of said profile of said each fiducial, said phase is determined at a period of twice a length of said each fiducial; and, converting said phase into a process direction displacement.

2. The method of claim 1, wherein said printing a test pattern further includes an alignment bar proximal to said plurality of strips.

3. The method of claim 2, further comprising filtering a profile of said alignment bar including:

analyzing each pixel column in a sequence starting from one side of said image and proceeding to the other side of said image including identifying a current process direction transition index where a transition from high scanner response to low scanner response occurs;

comparing said current process direction transition index to a previous process direction transition index; and, identifying a next process direction transition index.

4. A method for measuring spatial uniformity in an image, comprising:

printing a test pattern from an image forming device including a plurality of strips and rows of fiducials proximal thereto;

correcting for distortions in an image caused by printing and scanning artifacts;

mapping from scanner coordinates to digital image coordinates;

determining a gray level of each strip in said plurality of strips as a function of digital image cross process coordinate;

filtering a profile of said each strip whereby said artifacts from a halftone screen are eliminated;

wherein said mapping further includes determining a scanner cross process position coordinate of each fiducial in a selected row of said rows of fiducials;

wherein said determining a scanner cross process position coordinate of said each fiducial in said selected row of said rows of fiducials further includes:

identifying a thin window that encompasses a portion of said image along said selected row of said rows of fiducials;

sorting said each pixel column from a darkest pixel to a lightest pixel;

taking a cross section over a top section of said image including a region equal to a fiducial length;

identifying fiducial indices in a cross process position of all local minimums below a threshold;

removing from said mapping said fiducial indices having a spacing therebetween less than a predetermined spacing between fiducials; and, adding to said mapping said fiducial indices at predeterminable cross process positions where said fiducial indices are missing.

5. The method of claim 4 further comprising filtering said cross section with a low pass filter to remove structure along said selected row of said rows of fiducials.

6. The method of claim 4, further comprising determining a uniformity profile of said each strip as a function of a scanned pixel column index;

determining said mapping of said pixel column in a digital image to a cross process direction position in a scanned image; and, evaluating a scanner response for each mapped digital pixel column index.

7. The method of claim 6, wherein said mapping of said pixel column further includes interpolating said digital pixel column index to a scanned pixel column index.

8. A method for measuring spatial uniformity in an image, comprising:

printing a test pattern from an image forming device including a plurality of strips and rows of fiducials proximal thereto;

correcting for distortions in an image caused by printing and scanning artifacts;

mapping from scanner coordinates to digital image coordinates;

determining a gray level of each strip in said plurality of strips as a function of digital image cross process coordinate;

filtering a profile of said each strip whereby said artifacts from a halftone screen are eliminated;

measuring a cross section of said image for determining a dot and space periodicity pattern from a halftone brick of said strip; and, descreening said profile of said each strip whereby said cross section periodicity is removed from said profile.

9. The method of claim 8, wherein said descreening further includes: extracting a halftone contribution to said cross section including averaging a gray level for the same pixel in said halftone brick across the whole cross section; and, subtracting said halftone contribution from the signal.

10. The method of claim 8, wherein said descreening further includes:

constructing a series of notch filters whereby frequencies at the halftone frequencies are filtered.

11. The method of claim 8, wherein said descreening further includes constructing a low pass filter whereby frequencies at the halftone frequency are filtered.

12. A method for measuring spatial uniformity in an image that is translated through an image forming device, comprising:

printing a test pattern from an image forming device including a plurality of strips in a process direction, said test pattern includes a series of fiducials aligned in rows in said process direction, each said row of fiducials proximal to a separate one of said plurality of strips;

determining a process direction displacement as a function of a cross process position of a first strip of said test pattern;

shifting each pixel column of an image in said process direction to adjust said first strip in a horizontal orientation;

identifying a location of said first strip and a first row of fiducials proximal thereto;

determining a scanner cross process position coordinate of each fiducial in said first row of fiducials;

mapping said scanner cross process position coordinates to digital image cross process position coordinates;

determining a uniformity profile of said first strip including said mapping from a measured scanner response as a function of cross process scanned image pixel column to a corresponding inferred scanner response as a function of cross process digital image pixel column; and, said uniformity profile includes a linear combination of the scanner response averaged over a strip width for a pixel column to the left and for a pixel column to the right of the cross process position in scanner units corresponding to each cross process digital image position.

13. The method of claim 12, wherein said mapping further includes translating said each fiducial from said scanner cross process position coordinates to said digital image cross process position coordinates.

14. The method of claim 12, further comprising analyzing a second strip including:
   identifying the location of said second strip and a second row of fiducials proximal thereto;
   identifying process direction indices of said second strip;
   identifying process direction indices of said second row of fiducials;
   determining a scanner cross process position coordinate of each fiducial in said second row of fiducials; and,
   mapping said each fiducial in said second row of fiducials from scanner cross process position coordinates to digital image cross process position coordinates.

15. The method of claim 12, further comprising:
   determining a rotation of said first row of fiducials including taking a process direction cross section of scanner response and process direction position through said each fiducial in said first row of fiducials;
   determining the process direction position of said each fiducial; and,
   shifting each pixel column of the image in said process direction to adjust said first row of fiducials in a horizontal orientation.

16. The method of claim 12, wherein determining said profile of said first strip further includes:
   analyzing each pixel column in sequence starting from a left side of the image and proceeding to a right side of the image including identifying a current process direction transition index where a transition from a high scanner response to a low scanner response occurs;
   comparing said current process direction transition index to a previous process direction transition index; and,
   identifying a next process direction transition index.

17. A method for measuring spatial uniformity in an image that is translated through an image forming device, comprising:
   printing a test pattern from an image forming device including a plurality of strips in a process direction, said test pattern includes a series of fiducials aligned in rows in said process direction, each said row of fiducials proximal to a separate one of said plurality of strips;
   determining a process direction displacement as a function of a cross process position of a first strip of said test pattern;
   shifting each pixel column of an image in said process direction to adjust said first strip in a horizontal orientation;
   identifying a location of said first strip and a first row of fiducials proximal thereto;
   determining a scanner cross process position coordinate of each fiducial in said first row of fiducials;
   mapping said scanner cross process position coordinates to digital image cross process position coordinates;
   determining a rotation of said first row of fiducials including taking a process direction cross section of scanner response and process direction position through said each fiducial in said first row of fiducials;
   determining the process direction position of said each fiducial; and,
   shifting each pixel column of the image in said process direction to adjust said first row of fiducials in a horizontal orientation;
   determining the process direction position of said each fiducial further includes:
   determining a phase of the profile at a period of twice the length of said each fiducial; and,
   converting said phase to a process direction displacement.

18. A process for measuring spatial uniformity in an image that is translated through an image forming device, said process comprising:
   printing a test pattern from an image forming device including a top line and a plurality of strips below said top line in a process direction, said test pattern includes a series of fiducials aligned in rows in said process direction, each said row of fiducials adjacent to a separate one of said plurality of strips;
   determining a process direction displacement as a function of a cross process position of said top line of said test pattern;
   shifting each pixel column of an image in said process direction to adjust said top line in a horizontal orientation;
   identifying a location of a first strip from said plurality of strips and a first row of fiducials adjacent thereto;
   determining a scanner cross process position coordinate of each fiducial in said first row of fiducials;
   identifying a thin window that encompasses a portion of said image along said first row of fiducials;
   sorting said each pixel column from a darkest pixel to a lightest pixel;
   taking a cross section taken over a top section of the image including a region equal to a fiducial length;
   identifying fiducial indices in a cross process position of all local minimums below a threshold;
   removing said fiducial indices from said mapping having a spacing therebetween less than a predetermined spacing between fiducials; and,
   adding said fiducial indices to said mapping at predeterminable cross process positions where said fiducial indices are missing.

19. The process of claim 18, further comprising:
   filtering said cross section with a low pass filter to remove structure along said first row of fiducials.

20. A process for measuring print uniformity in an image that is translated through an image forming device, said process comprising:
   measuring a cross section of an image for determining a dot and space periodicity pattern from a halftone brick;
   said measuring includes:
      printing a test pattern from the image forming device including a top line and a plurality of strips in a process direction, said test pattern includes a series of fiducials aligned in a rows in said process direction, each said row of fiducials proximal to a strip;
      determining a process direction displacement as a function of a cross process position of said top line of said test pattern;
      extracting a profile of said top line;
      shifting each pixel column of the image in said process direction to adjust said top line in a horizontal orientation;
      identifing the location of a selected strip from said plurality of strips and a selected row of fiducials adjacent thereto; and, descreening the halftone brick to remove the cross section periodicity.

21. The process for measuring print uniformity according to claim 20, wherein said descreening said halftone brick includes:
- extracting a halftone contribution to the cross section including averaging the gray level for the same pixel in said halftone brick across the whole cross section; and,
- subtracting said halftone contribution from the signal thereby leaving only the true nonuniformity signal.

22. The process for measuring print uniformity according to claim 20, wherein said descreening said halftone brick includes:
- constructing a series of notch filters whereby frequencies at the halftone frequencies are filtered.

23. The process for measuring print uniformity according to claim 20, wherein said descreeening said halftone brick includes:
- constructing a low pass filter whereby frequencies at the halftone frequency are filtered.

* * * * *